United States Patent [19]

Ebara et al.

[11] Patent Number: 5,639,537
[45] Date of Patent: Jun. 17, 1997

[54] POLYPROPYLENE RESIN COMPOSITION FOR ORIENTED FILM AND ORIENTED FILM OF THE COMPOSITION

[75] Inventors: Takeshi Ebara, Ichihara; Hiroyuki Tanimura, Sodegaura; Hajime Sadatoshi, Ichihara; Kazuhiro Yamazaki, Niihama; Taiji Yamada, Niihama; Tuyoshi Hashimoto, Niihama, all of Japan

[73] Assignee: Sumitomo Chemical Company Limited, Osaka, Japan

[21] Appl. No.: 572,490

[22] Filed: Dec. 14, 1995

[30] Foreign Application Priority Data

Dec. 21, 1994 [JP] Japan .................................. 6-318183
Aug. 23, 1995 [JP] Japan .................................. 7-214444

[51] Int. Cl.$^6$ .............................. C08L 23/12; C08L 25/08
[52] U.S. Cl. .......................... 428/147; 525/225; 525/226; 525/227; 525/240
[58] Field of Search ................................ 525/225, 226, 525/227, 240; 428/147

[56] References Cited

U.S. PATENT DOCUMENTS 5,077,129 12/1991 Schinkel et al. ........................ 428/402

FOREIGN PATENT DOCUMENTS 0447652 9/1991 European Pat. Off. .
57-64522 4/1982 Japan .
5-214120 8/1993 Japan .
6-107868 4/1994 Japan .

OTHER PUBLICATIONS

Database WPI, Derwent Publication, AN 92-279691.

*Primary Examiner*—David Buttner
*Attorney, Agent, or Firm*—Sughrue, Mion, Zinn, Macpeak & Seas

[57] ABSTRACT

A polypropylene resin composition for oriented film excellent in transparency, slip property and blocking resistance which comprises the following components (a) and (b), and an oriented film obtained by orienting the composition at least in uniaxial direction:

(a) 100 parts by weight of a crystalline polypropylene resin, and (b) 0.05 or more but less than 1 part by weight of crosslinked polymer beads which have a weight average particle diameter of 0.5–5 μm, comprise 60–96% by weight of styrenic monomer units, 2–38% by weight of radical-polymerizable monomer units, the refractive index of the polymer of the radical-polymerizable monomer being 1.50 or less, and 2–50% by weight of crosslinkable monomer units, and give an average protuberance height of 60–600 nm on the surface of oriented film obtained by kneading the crosslinked polymer beads into the polypropylene resin followed by working up into oriented film.

17 Claims, No Drawings

POLYPROPYLENE RESIN COMPOSITION FOR ORIENTED FILM AND ORIENTED FILM OF THE COMPOSITION

BACKGROUND OF THE INVENTION

The present invention relates to a polypropylene resin composition and oriented film thereof. In more particular, it relates to a polypropylene resin composition for oriented film excellent in transparency, slip property and blocking resistance and oriented film of the composition.

Oriented polypropylene film is used in a wide variety of fields including food packaging, fiber packaging, etc. by virtue of its excellent transparency and mechanical properties. However, oriented polypropylene film, which has such excellent properties, is not free from shortcomings. In particular, when the sheets of the film are placed one upon another, they are apt to undergo the phenomenon of so-called blocking, that is, they tend to stick to one another; this greatly impairs the operability in packaging.

In order to improve the slip property and blocking resistance of polypropylene resin oriented film, there have been proposed methods which comprise kneading fine powders of inorganic substances as an antiblocking agent (hereinafter abbreviated as ABA) into polypropylene resin, forming the kneaded product into a sheet and then orienting the sheet. Such methods include the addition of zeolite, magnesium silicate, or the like to improve the blocking resistance (for example, JP-B-52-16134 and JP-B-48-14423) and the addition of silica fine powder to improve the blocking resistance (for example, JP-B-63-58170 and JP-A-4-288353). However, fine powders of inorganic substances are apt to undergo agglomeration; furthermore, since the affinity between polypropylene resins and inorganic substances is poor, voids are apt to develop in the oriented film during film orienting with the inorganic substances acting as nucleus, resulting in deterioration of film transparency.

In order to ameliorate the above-mentioned defects of the film incorporated with ABA of fine powders of inorganic substances, methods have been proposed which comprise dispersing ABA of high molecular substances in the form of fine powder into polypropylene resin, to obtain oriented film (for example, JP-A-57-64522, JP-A-5-214120 and JP-A-6-107868). However, these methods also have problems: When ABA having a small average particle diameter is used, it must be added in an amount of 1% by weight or more to obtain good slip property and blocking resistance and consequently a large number of fine surface irregularities are formed on the surface of the oriented film obtained, resulting in poor see-through impression of the film. Since the affinity between polypropylene resin and ABA of high molecular substance in poor, voids are apt to develop in the film during orienting, causing the deterioration of optical properties, so that ABA of high molecular substance cannot be used in a high concentration. Furthermore, since the degree of crosslinking of the ABA is insufficient, the blocking resistance of the resulting oriented film is unsatisfactory.

In view of such situations, the present inventors have made extensive study to improve the slip property and blocking resistance of polypropylene oriented film without greatly impairing its transparency. As the result, the inventors have found that a polypropylene resin composition for oriented film and the oriented film of the composition which meet the above-mentioned object can be obtained by using as ABA crosslinked polymer beads having a specific structure and thus attained the present invention.

SUMMARY OF THE INVENTION

The object of the present invention is to provide a polypropylene resin composition for oriented film excellent in transparency, slip property and blocking resistance and an oriented film obtained by orienting the resin composition in at least uniaxial direction.

The present invention relates to a polypropylene resin composition for oriented film which comprises the following components (a) and (b) and to an oriented film obtained by orienting the composition at least in uniaxial direction:

(a) 100 parts by weight of a crystalline polypropylene resin, and (b) 0.05 or more but less than 1 part by weight of crosslinked polymer beads which have a weight average particle diameter of 0.5–5 μm, comprise 60–96% by weight of styrenic monomer units, 2–38% by weight of radical-polymerizable monomer units (the refractive index of the polymer of the radical-polymerizable monomer being 1.50 or less), and 2–50% by weight of crosslinkable monomer units, and give an average protuberance height of 60–600 nm on the surface of oriented film obtained by kneading the crosslinked polymer beads into the crystalline polypropylene resin, followed by working up into oriented film.

DETAILED DESCRIPTION OF THE INVENTION

The present invention is described in detail below.

The crystalline polypropylene resin of the component (a) in the present invention refers to known crystalline polymers comprising propylene as the main monomer unit, which include crystalline propylene homo-polymers and crystalline propylene polymers containing 2% by weight or less of α-olefins, such as ethylene, butene-1, etc. The α-olefins contained in the crystalline propylene polymer may be of two or more kinds in combination. These polypropylenes may be obtained, for example, by using the highly active catalysts disclosed in, for example, JP-B-64-6211 or JP-B-4-37084, and either feeding propylene alone into the polymerization system or feeding propylene and a small amount of α-olefin into the polymerization system.

The crosslinked polymer beads of the component (b) used in the present invention have a weight average particle diameter of 0.5–5 μm, preferably 0.8–3 μm. When the weight average particle diameter is too small, the polymer beads cannot form on the oriented film surface protuberances having sufficient height to impart good blocking resistance to the film. When the weight average particle diameter is too large, on the other hand, a severe stress concentration is apt to develop at the interface between the crosslinked polymer beads and polypropylene during film orienting to cause peeling at the interface and resultant development of voids, or the crosslinked polymer beads themselves cause light scattering; these result in deterioration of see-through clarity of the film.

The crosslinked polymer beads contain 60–96% by weight, preferably 70–92% by weight, of styrenic monomer units in the crosslinked polymer. When the content of the styrenic monomer unit is too low, voids are apt to develop at the time of film orienting, causing deterioration of see-through clarity of the film. When the content is too high, on the other hand, the haze of the resulting film is deteriorated owing to the light scattering caused by the crosslinked polymer beads themselves. Examples of the styrenic monomer which can be used in the present invention include styrene, methylstyrene, ethylstyrene, butylstyrene, propylstyrene, and the like. Furthermore, the crosslinked polymer beads used in the present invention contain 2–38% by weight, preferably 5–28% by weight, of radical-polymerizable monomer units in the crosslinked polymer (the refractive index of the polymer of the radical-polymerizable monomer being 1.50 or less). When the content of the radical-polymerizable monomer unit is too low, the resulting film has a poor haze owing to the light scattering caused by crosslinked polymer beads themselves. When the content is too high, on the other hand, voids are apt to develop at the time of film orienting, causing the deterioration of see-through clarity of the film. The polymer of the radical-polymerizable monomer must have a refractive index of 1.50 or less. When the refractive index is higher than 1.50, the difference between the refractive index of the crosslinked polymer bead and that of the crystalline polypropylene resin becomes large, resulting in lowered transparency of the resin composition. Examples of such monomers are those described in Polymer Handbook, 3rd. Ed., VI/451–461 (ed. by J. Brandrup and E. H. Immergut, 1989, John Wiley & Sons. Inc.). Specific examples thereof include butyl acrylate, t-butyl methacrylate, vinyl propionate, vinyl acetate, methyl acrylate, isopropyl methacrylate, dodecyl methacrylate, tetradecyl methacrylate, hexadecyl methacrylate, vinyl formate, isobutyl methacrylate, vinylacetal, vinylbutyral, hexyl methacrylate, butyl methacrylate, ethylidene dimethacrylate, propyl methacrylate, 3,3,5-trimethylcyclohexyl methacrylate, ethyl methacrylate, methyl methacrylate, vinyl alcohol and 4-methylcyclohexyl methacrylate. Particularly preferably used of these are methyl methacrylate, ethyl methacrylate, butyl methacrylate, methyl acrylate, ethyl acrylate and butyl acrylate.

The crosslinked polymer beads used in the present invention further contain 2–50% by weight, preferably 2–30% by weight, more preferably 3–20% by weight, of crosslinkable monomer units in the crosslinked polymer. When the content of the crosslinkable monomer unit is too low, the polymer beads cannot maintain their bead form when melt-extruded together with polypropylene and hence cannot form, on the oriented film surface, protuberances having a sufficient height for imparting a good blocking resistance to the film.

Specific examples of the crosslinkable monomer used in the present invention include divinylbenzene, ethyleneglycol dimethacrylate, ethyleneglycol diacrylate, trimethylolpropane trimethacrylate, trimethylolpropane triacrylate, and the like. Among these, divinylbenzene is particularly preferable.

The crosslinked polymer beads used in the present invention must be capable of giving an average protuberance height of 60–600 nm, preferably 80–500 nm, more preferably 100–400 nm on the surface of oriented film obtained by kneading the crosslinked polymer beads into polypropylene resin, followed by working up into oriented film. When the average protuberance height is too low, the blocking resistance of oriented film obtained becomes poor. On the other hand, when the average protuberance height is too high, the see-through clarity of oriented film becomes poor because of increase of light scattering on the surface of the film. In the present invention, the average protuberance height of the oriented film surface is determined by using an atomic force microscope (AFM). Specifically, from the picture image obtained by AFM observation of the film surface are extracted the protruding parts of the film surface, and the difference in height between the protruding part and the base line is determined and taken as the data for single protuberance height. The average protuberance height is determined from these data.

In the polypropylene resin composition of the present invention, by using 0.05 or more but less than 1 part by weight, preferably 0.07 or more but less than 0.6 part by weight, more preferably 0.08 or more but less than 0.5 part by weight, of the crosslinked polymer beads per 100 parts by weight of the crystalline polypropylene resin, a polypropylene resin oriented film having excellently balanced transparency and blocking resistance can be obtained without deterioration of film appearance.

In the present invention, a master batch containing about 1–50 parts by weight of crosslinked polymer beads in 100 parts by weight of polypropylene resin may be prepared beforehand and then mixed in a proper proportion to obtain an intended resin composition having a predetermined crosslinked polymer bead concentration. In this case, the ultimate concentration of the crosslinked polymer beads added must be 0.05 or more but less than 1 part by weight per 100 parts by weight of the entire crystalline polypropylene resin including the polypropylene resin contained in the master batch.

The method used for adding the crosslinked polymer beads to the polypropylene resin in the present invention is not particularly limited so long as it ensures uniform dispersion of the crosslinked polymer beads. A suitable method, for example, comprises mixing the two components in a ribbon blender, Henschel mixer, or the like and melt-kneading the mixture in an extruder. At this time, if necessary, known additives as anti-oxidants, neutralizing agents, lubricants, antifogging agents, antistatic agents, etc. may be added as desired within limits not deleterious to the object of the present invention.

The polypropylene resin composition of the present invention thus obtained may be melt-extruded in a conventional manner, then cooled, and oriented at least in uniaxial direction by a conventional method, to give film.

Though the thickness of the film of the present invention is not particularly restricted, it is preferably 200 μm or less, more preferably 5–100 μm, still more preferably 8–50 μm.

The present invention is described in more detail below with reference to Examples and Comparative Examples, but the invention is in no way limited by the Examples.

EXAMPLES

The measured values of the respective items shown in the detailed description and the examples of the present invention were determined by the following methods.

(1) Weight average particle diameter (unit: μm): This was determined with a particle size analyzer by light diffraction scattering method. (Microtrack FRA, mfd. by Leeds & Northrup Ltd.)

(2) Haze (unit: %): The haze was determined according to ASTM D-1003.

(3) Scattering transmitted light intensity (LSI) (unit: %): This was determined with a LSI tester (mfd. by Toyo Seiki K.K., receiving scattering transmitted light in the range of ±0.4°–1.2°). Since the LSI value corresponds fairly well to the see-through impression obtained by visual observation, the value was used as the measure for see-through impression.

(4) Slip property: The static friction coefficient (μs) and the kinetic friction coefficient (μk) of the film were determined according to ASTM D-1894.

(5) Blocking resistance (unit: kg/20 cm$_2$): Two film sheets each 80 mm by 120 mm in dimension were placed one upon the other so that they overlap by 100 mm in the lengthwise direction and their corona-treated surfaces face to each other. The sheets were put between glass plates and conditioned under a load of 2 kg at 50° C. for 48 hours. Thereafter, they were allowed to stand in an atmosphere of 23° C. and 50% humidity for at least 30 minutes, and then subjected to a shearing tensile test at a rate of 200 mm/min to determine the strength necessary for peeling apart the sample.

(6) Average protuberance height (unit: nm): This was determined by using an atomic force microscope (AFM) (TMX-2000 type SPM, mfd. by TOPOMETRIX Corp.) under the following conditions.

Measuring mode: constant mode, using normal tip.

Measuring range: 75 μm×75 μm,

Scanning speed: 300 μm/sec,

Number of image element: 500×500,

Scanning direction: 45° to TD and MD (transversal and machine directions) of film

EXAMPLE 1

(a) Preparation of crosslinked polymer beads

In a glass flask equipped with a stirrer were placed 100 parts by weight of ethanol, 1 part by weight of hydroxypropyl cellulose, 15 parts by weight of styrene, 5 parts by weight of methyl methacrylate, 1.5 parts by weight of 55% by weight divinylbenzene and 0.5 part by weight of benzoyl peroxide, and made into a solution. The solution mixture was polymerized at 79° C. for 9 hours, then concentrated and dried to obtain crosslinked polymer beads. The crosslinked polymer beads thus obtained had a weight average particle diameter of 1.1 μm.

(b) Preparation of oriented film

With 100 parts by weight of propylene homo-polymer powder having a melt index of 2.3 g/10 min were mixed 1.0 part by weight of stearic ester of stearyldiethanolamine as an antistatic agent, 5 parts by weight of the solid of the crosslinked polymer beads obtained in above (a), and 0.1 part by weight of calcium stearate, 0.2 part by weight of BHT (2.6-di-tert-butylhydroxytoluene) and 0.05 part by weight of Irganox 1010 (an antioxidant, mfd. by Ciba-Geigy Ltd.) respectively as stabilizers, in a Henschel mixer, and the mixture was granulated into pellets through a 40 mmφ extruder to obtain a master batch of the crosslinked polymer beads. Separately, 100 parts by weight of propylene polymer powder having a melt index of 2.3 g/10 min was mixed with 2.0 parts by weight of stearic ester of stearyldiethanolamine as an antistatic agent, and 0.1 part by weight of calcium stearate, 0.2 part by weight of BHT (2,6-di-tert-butylhydroxytoluene) and 0.05 part by weight of Irganox 1010 (an antioxidant, mfd. by Ciba-Geigy Ltd.), respectively as stabilizers, in a Henschel mixer, and the mixture was granulated into pellets through a 65 mmφ extruder to obtain a master batch of the antistatic agent.

Then, to 46 parts by weight of polypropylene pellets (Sumitomo Noblen mfd. by Sumitomo Chemical Co., Ltd., grade: FS2011D, melt index: 2.5 g/10 min) were added 46 parts by weight of the antistatic agent master batch obtained above and further 8 parts by weight of the crosslinked polymer bead master batch obtained above, and mixed in a pellet blender. The resulting blend was melt-extruded at a resin temperature of 260° C., then cooled by quenching with a cooling roll of 60° C. to solidify into a sheet 0.8 mm in thickness. Then the sheet was preheated, oriented longitudinally 5-fold at an orientation temperature of 145° C. by means of the peripheral speed difference of rolls of the longitudinal stretching machine, subsequently oriented transversally 8-fold at an orientation temperature of 157° C. with a tenter-type stretching machine and heat-treated at 165° C., to obtain oriented film 20 μm in thickness. The film was then corona-treated on one side.

The film was evaluated for its properties and the results are shown in Table 1.

EXAMPLE 2

With 100 parts by weight of propylene polymer powder having a melt index of 2.3 g/10 min were mixed 0.4 part by weight of the crosslinked polymer beads prepared in Example 1(a), 1.0 part by weight of stearic ester of stearyldiethanolamine as an antistatic agent, and 0.1 part by weight of calcium stearate, 0.2 part by weight of BHT and 0.05 part by weight of Irganox 1010, respectively as stabilizers, in a henschel mixer, and the mixture was granulated through a 40 mmφ extruder into pellets.

The pellets obtained above were melt-extruded at a resin temperature of 260° C., and cooled by quenching with a cooling roll of 60° C. to solidify into a sheet 0.8 mm in thickness. Then the sheet was preheated, oriented longitudinally 5-fold at an orientation temperature of 145° C. by means of the peripheral speed difference of rolls of the longitudinal stretching machine, subsequently oriented transversally 8-fold at an orientation temperature of 157° C. with a tenter-type stretching machine and heat-treated at 165° C., to obtain oriented film. The film was then corona-treated on one side.

The film thus obtained was evaluated for its properties and the results are shown in Table 1.

EXAMPLE 3

(a) Preparation of crosslinked polymer beads

The procedures of the preparation of crosslinked polymer beads of Example 1(a) were repeated except for using 18.3 parts by weight of styrene in place of 15 parts by weight of styrene of Example 1(a) and 1.7 parts by weight of methyl methacrylate in place of 5 parts by weight of methyl methacrylate of Example 1(a). The crosslinked polymer beads thus obtained had a weight average particle diameter of 1.1 μm.

(b) Preparation of oriented film

A master batch of crosslinked polymer beads was prepared in the same manner as in Example 1(b) except for using the crosslinked polymer beads obtained in above (a). Then oriented film was prepared in the same manner as in Example 1(b) except for using the master batch obtained above. The oriented film thus obtained was evaluated for its properties, and the results are shown in Table 1.

COMPARATIVE EXAMPLE 1

The procedures of the preparation of crosslinked polymer beads of Example 1(a) were repeated except that 20 parts by weight of styrene was used in place of 15 parts by weight of styrene and that methyl methacrylate was not used. The crosslinked polymer beads thus obtained had a weight average particle diameter of 1.2 μm.

(b) Preparation of oriented film

A master batch of crosslinked polymer beads was prepared in the same manner as in Example 1(b) except for using the crosslinked polymer beads obtained in above (a). Then oriented film was prepared in the same manner as in Example 1(b) except that the crosslinked polymer bead master batch used was replaced by 6 parts by weight of the master batch of crosslinked polymer beads prepared above and that the amounts of FS2011D and the antistatic agent master batch were altered respectively to 47 parts by weight. The oriented film thus obtained was evaluated for its properties and the results are shown in Table 1.

In this example, since the crosslinked polymer beads contain no radical-polymerizable monomer unit, the transparency (expressed by haze) of the resulting film is poor.

COMPARATIVE EXAMPLE 2

(a) Preparation of crosslinked polymer beads

In a glass flask equipped with a stirrer were placed an aqueous solution obtained by dissolving 0.05 part by weight of cetyl sodium sulfate in 100 parts by weight of deionized water and a mixed solution obtained by dissolving 0.06 part by weight of lauroyl peroxide and 2.5 parts by weight of 55% divinylbenzene in 33 parts by weight of styrene, and were stirred at a high speed of 8000 rpm for 10 minutes with a Homomixer to disperse the monomer solution finely in the aqueous solution. The resulting dispersion was heated to 65° C. and polymerization was continued for 6 hours. Thereafter the polymerization mixture was further brought up to 85° C. and the polymerization was terminated after 2 hours, to obtain crosslinked polymer beads. The crosslinked polymer beads thus obtained had a weight average particle diameter of 6.7 µm.

(b) Preparation of oriented film

A master batch of crosslinked polymer beads was obtained in the same manner as in Example 1(b) except for using the crosslinked polymer beads obtained in above (a). Then oriented film was prepared in the same manner as in Example 1(b) except that the crosslinked polymer master batch used was replaced by 4 parts by weight of the master batch of crosslinked polymer beads prepared above and that the amounts of FS2011D and the antistatic agent master batch were altered respectively to 48 parts by weight. The oriented film thus obtained was evaluated for its properties and the results are shown in Table 1.

In this example, since the weight average particle diameter of the polymer beads is too large, the average protuberance height on the oriented film surface is also too high and the transparency of the film expressed by LSI is very poor.

COMPARATIVE EXAMPLE 3

(b) Preparation of oriented film

A master batch of crosslinked polymer beads was prepared in the same manner as in Example 1(b) except for using Epostar MA1002 (a crosslinked methyl methacrylate polymer, mfd. by NIPPON SHOKUBAI CO., LTD., having a weight average particle diameter of 2.3 µm) as the crosslinked polymer beads. Then oriented film was prepared in the same manner as in Example 1(b) except that the crosslinked polymer bead master batch used was replaced by 6 parts by weight of the master batch of crosslinked polymer beads prepared above and that the amounts of FS2011D and the antistatic agent master batch were altered respectively to 47 parts by weight. The oriented film thus obtained was evaluated for its properties and the results are shown in Table 1.

In this example, since the crosslinked polymer beads contain no styrenic monomer unit, the haze and the transparency (expressed by LSI) of the film are very poor.

COMPARATIVE EXAMPLE 4

(a) Preparation of crosslinked polymer beads

The procedures in the preparation of crosslinked polymer beads of Example 1(a) were repeated except for using 10 parts by weight of styrene in place of 15 parts by weight of styrene and 10 parts by weight of methyl methacrylate in place of 5 parts by weight of methyl methacrylate. The crosslinked polymer beads thus obtained had a weight average particle diameter of 1.1 µm.

(b) Preparation of oriented film

Oriented film was prepared in the same manner as in Example 1(b) except that the crosslinked polymer bead master batch used was replaced by a master batch of crosslinked polymer beads prepared in the same manner as in Example 1(b) but by using the crosslinked polymer beads obtained in above (a). The oriented film thus obtained was evaluated for its properties and the results are shown in Table 1.

In this example, since the content of the styrenic monomer unit in the crosslinked polymer beads is too low and the contents of the radical-polymerizable monomer units therein is too high, the haze and the transparency (expressed by LSI) of the film are very poor.

COMPARATIVE EXAMPLE 5

(a) Preparation of crosslinked polymer beads

The procedures of the preparation of crosslinked polymer beads of Example 1(a) were repeated except for using 0.37 part by weight of 55% by weight of divinylbenzene in place of 1.5 parts by weight of 55% by weight of divinylbenzene. The crosslinked polymer beads thus obtained had a weight average particle diameter of 1.3 µm.

(b) Preparation of oriented film

Oriented film was prepared in the same manner as in Example 1(b) except that the crosslinked polymer bead master batch used was replaced by a master batch of crosslinked polymer beads prepared in the same manner as in Example 1(b) but by using the crosslinked polymer beads obtained in above (a). The oriented film thus obtained was evaluated for its properties and the results are shown in Table 1.

In this example, since the content of the crosslinkable monomer unit in the crosslinked polymer beads is too low, the blocking resistance of the film is poor.

COMPARATIVE EXAMPLE 6

(a) Preparation of crosslinked polymer beads

The procedures of the preparation of crosslinked polymer beads of Example 1(a) were repeated except for using 20 parts by weight of styrene in place of 15 parts by weight of styrene, using 0.37 part by weight of 55% by weight of divinylbenzene in place of 1.5 parts by weight of 55% by weight divinylbenzene and using no methyl methacrylate. The crosslinked polymer beads thus obtained had a weight average particle diameter of 1.7 µm.

(b) Preparation of oriented film

A master batch of crosslinked polymer beads was prepared in the same manner as in Example 1(b) except for using the crosslinked polymer beads obtained in above (a). Then oriented film was prepared in the same manner as in Example 1(b) except that the crosslinked polymer bead master batch used was replaced by 6 parts by weight of the master batch of crosslinked polymer beads prepared above and that the amounts of FS2011D and the antistatic agent master batch were altered respectively to 47 parts by weight. The oriented film thus obtained was evaluated for its properties and the results are shown in Table 1.

In this example, since the content of the crosslinkable monomer unit in the crosslinked polymer beads is too low, the blocking resistance of the film is very poor.

TABLE 1

| | Crosslinked polymer beads | | | |
| --- | --- | --- | --- | --- |
| | Polymer beads composition | | | Weight average |
| | Styrene (wt %) | MMA (wt %) | Crosslinkable monomer (wt %) | particle diameter (µm) |
| Example 1 | 72.0 | 24.0 | 4.0 | 1.1 |
| Example 2 | 72.0 | 24.0 | 4.0 | 1.1 |
| Example 3 | 88.3 | 7.7 | 4.0 | 1.1 |

TABLE 1-continued

| | | | | |
|---|---|---|---|---|
| Comp.Example 1 | 96.0 | 0 | 4.0 | 1.2 |
| Comp.Example 2 | 96.0 | 0 | 4.0 | 6.7 |
| Comp.Example 3 | 0 | 100-X | X | 2.3 |
| Comp.Example 4 | 48.0 | 48.0 | 4.0 | 1.1 |
| Comp.Example 5 | 74.2 | 24.8 | 1.0 | 1.3 |
| Comp.Example 6 | 99.4 | 0 | 0.6 | 1.7 |

| | Oriented film | | | | | | |
|---|---|---|---|---|---|---|---|
| | Compounding amount of crosslinked polymer beads (PHR) | Average protuberance height (nm) | Haze (%) | LSI (%) | Slip property μs | Slip property μk | Blocking resistance (kg/20 cm²) |
| Example 1 | 0.4 | 215 | 3.9 | 1.5 | 0.18 | 0.22 | 0.36 |
| Example 2 | 0.4 | 181 | 3.7 | 1.4 | 0.24 | 0.23 | 0.33 |
| Example 3 | 0.4 | 146 | 4.0 | 1.4 | 0.24 | 0.21 | 0.48 |
| Comp.Example 1 | 0.3 | 106 | 4.6 | 1.8 | 0.16 | 0.18 | 0.29 |
| Comp.Example 2 | 0.2 | 609 | 3.4 | 15 | 0.17 | 0.15 | 0.29 |
| Comp.Example 3 | 0.3 | 364 | 4.8 | 12 | 0.18 | 0.16 | 0.32 |
| Comp.Example 4 | 0.4 | 187 | 7.1 | 6.9 | 0.28 | 0.22 | 0.36 |
| Comp.Example 5 | 0.4 | 105 | 2.7 | 1.7 | 0.32 | 0.29 | 0.97 |
| Comp.Example 6 | 0.3 | 57 | 0.3 | 2.6 | >0.8* | >0.8* | >0.9* |

Note:
1) *: Determination was impossible because the maximum value of measurable range was exceeded.
2) Since the crosslinkable monomer content in the ABA (Epostar MA 1002, mfd. by NIPPON SHOKUBAI CO., LTD.) used in Comparative Example 3 is unknown, it was expressed as X in the table.

According to the present invention, a polypropylene resin composition for oriented film excellent in transparency, slip property and blocking resistance and the oriented film thereof can be provided.

The film provided by the present invention can be used in a wide variety of fields including food packaging, fiber packaging, etc. by virtue of its excellent transparency.

What is claimed is:

1. A polypropylene resin composition for oriented film which comprises the following components (a) and (b):

(a) 100 parts by weight of a crystalline polypropylene resin, and (b) 0.05 or more but less than 1 part by weight of crosslinked polymer beads which have a weight average particle diameter of 0.5–5 μm, comprise 60–96% by weight of styrenic monomer units, 2–38% by weight of radical-polymerizable monomer units, the refractive index of the polymer of the radical-polymerizable monomer being 1.50 or less, and 2–50% by weight of crosslinkable monomer units, and give an average protuberance height of 60–600 nm on the surface of oriented film obtained by kneading the crosslinked polymer beads into the crystalline polypropylene resin followed by working up into oriented film.

2. The polypropylene resin composition according to claim 1 wherein the crosslinked polymer beads (b) have a weight average particle diameter of 0.8 to 3 μm.

3. The polypropylene resin composition according to claim 1 wherein the crosslinked polymer beads (b) contain 70 to 92% by weight of styrenic monomer units.

4. The polypropylene resin composition according to claim 1 wherein the radical-polymerizable monomer unit is the unit of at least one monomer selected from the group consisting of butyl acrylate, t-butyl methacrylate, vinyl propionate, vinyl acetate, methyl acrylate, isopropyl methacrylate, dodecyl methacrylate, tetradecyl methacrylate, hexadecyl methacrylate, vinyl formate, isobutyl methacrylate, vinylacetal, vinylbutyral, hexyl methacrylate, butyl methacrylate, ethylidene dimethacrylate, propyl methacrylate, 3,3,5-trimethylcyclohexyl methacrylate, ethyl methacrylate, methyl methacrylate, vinyl alcohol and 4-methylcyclohexyl methacrylate.

5. The polypropylene resin composition according to claim 1 wherein the crosslinked polymer beads (b) contain 2 to 30% by weight of crosslinkable monomer units.

6. The polypropylene resin composition according to claim 1 wherein the average protuberance height is 80 to 500 nm.

7. The polypropylene resin composition according to claim 1 which contains 0.07 or more but less than 0.6 part by weight of crosslinked polymer beads (b) per 100 parts by weight of the crystalline polypropylene resin.

8. An oriented film which is obtained by orienting at least in uniaxial direction a polypropylene resin composition which comprises the following components (a) and (b):

(a) 100 parts by weight of a crystalline polypropylene resin, and (b) 0.05 or more but less than 1 part by weight of crosslinked polymer beads which have a weight average particle diameter of 0.5–5 μm, comprise 60–96% by weight of styrenic monomer units, 2–38% by weight of radical-polymerizable monomer units, the refractive index of the polymer of the radical-polymerizable monomer being 1.50 or less, and 2–50% by weight of crosslinkable monomer units, wherein the oriented film has an average protuberance height of 60–600 nm on the surface.

9. The oriented film according to claim 8 wherein the crosslinked polymer beads (b) have a weight average particle diameter of 0.8 to 3 μm.

10. The oriented film according to claim 8 wherein the crosslinked polymer beads contain 70 to 92% by weight of styrenic monomer units.

11. The oriented film according to claim 8 wherein the radical-polymerizable monomer unit is the unit of at least one monomer selected from the group consisting of butyl acrylate, t-butyl methacrylate, vinyl propionate, vinyl acetate, methyl acrylate, isopropyl methacrylate, dodecyl methacrylate, tetradecyl methacrylate, hexadecyl methacrylate, vinyl formate, isobutyl methacrylate, vinylacetal, vinylbutyral, hexyl methacrylate, butyl methacrylate, ethylidene dimethacrylate, propyl methacrylate, 3,3,5-trimethylcyclohexyl methacrylate, ethyl methacrylate, methylmethacrylate, vinyl alcohol and 4-methylcyclohexyl methacrylate.

12. The oriented film according to claim 8 wherein the crosslinked polymer beads (b) contain 2 to 30% by weight of crosslinkable monomer units.

13. The oriented film according to claim 8 wherein the average protuberance height is 80 to 500 nm.

14. The oriented film according to claim 8 which contains 0.07 or more but less than 0.6 part by weight of crosslinked polymer beads (b) per 100 parts by weight of the crystalline polypropylene resin.

15. The oriented film according to claim 8 which has a film thickness of 200 μm or less.

16. The polypropylene resin composition according to claim 1, wherein the styrenic monomer is selected from the group consisting of styrene, methylstyrene, ethylstyrene, butylstyrene and propylstyrene.

17. The oriented film according to claim 8, wherein the styrenic monomer is selected from the group consisting of styrene, methylstyrene, ethylstyrene, butylstyrene and propylstyrene.

\* \* \* \* \*